350-376 SR
XR 3,436,745
TX 4029D
CROSS REFERENCE SEARCH ROOM

April 1, 1969 D. G. KNOX 3,436,745

INFORMATION, STORAGE AND RETRIEVAL DEVICE

Filed June 4, 1965

INVENTOR.
DONALD G. KNOX,

By His Attorneys
Spensley & Horn

3436745
OR IN 365/60

United States Patent Office 3,436,745
Patented Apr. 1, 1969

3,436,745

INFORMATION, STORAGE AND RETRIEVAL DEVICE

Donald George Knox, Reseda, Calif.
(3134 W. Gelding, Drive, Phoenix, Ariz. 85023)

Filed June 4, 1965, Ser. No. 461,456
Int. Cl. G11b *5/00;* G02b *5/14;* G02f *1/22*
U.S. Cl. 340—174 8 Claims

ABSTRACT OF THE DISCLOSURE

Information storage memory system comprising an optical fiber which has transmitted therethrough a polarized electromagnetic beam. The material of said fiber is of those that have a characteristic such that the plane of polarization in the fiber will be rotated in the presence of a magnet. A magnet gap is positioned around said fiber in such a manner as to create a component of the magnetic field thereby created parallel to said fiber and electromagnetic beam path. An optical analyzer is positioned in the path of said electromagnetic beam after the magnet, said analyzer either passes or prohibits the passing of the electromagnetic beam depending on its state of polarization. A sensor is provided after said analyzer to determine whether or not the beam is passing through the analyzer.

The memory systems of a large majority of modern digital computers are magnetic core devices in which the information is stored by the magnetization of a tiny magnetic toroid device (core) in one polarity or the other. To "read" the information stored in the core it is necessary to destroy the stored data and so, after each such reading, the signal just sampled must be regenerated in order to be available for a subsequent reading thereof.

The read-regenerate cycle as described in modern computer systems is about 2 microseconds. During this time interval, the memory core is unusable and thus seriously limits the speed of operation of the computer system. For more efficient computer operates a greater speed is desirable in successive readings of memory devices.

This invention contemplates a new memory storage device and system wherein the memory element can be "read" without destroying the information thereon and therefore does not require regeneration. The read and write functions are isolated to the degree that it is even possible for the same memory element to be sampled by more than one section of the computer at the time or even by different computers at the same time since at no time is the information storage condition changed during the readings or sampling operations being performed thereon.

The other components of a modern computer system are capable of speeds of operation an order of magnitude greater than the best memory devices of the magnetic type usually incorporated therein. Since the primary limiting factor in such systems is the memory element, the device contemplated herein will overcome the disparity in speed between the memory system and the remainder of the computer. Since, through the use of the devices and system hereinafter described, the memory is not unavailable during a regeneration period (there is no need for the regeneration with this system) computer speeds can be increased some ten times or more by the use of the present invention.

The basis of the present invention is the Faraday effect. This may be described as the property of certain substances, which without other factors present do not exhibit optical activity in which the plane of polarization of plane-polarized light is rotated therein, but which may have imparted to them the property of rotating the plane of polarization of the light therein when placed in a magnetic field. The polarized light traverses the substance in the direction of the lines of magnetic force. If the magnetic field is reversed, the direction of the rotation of the plane of polarization is reversed. A particular feature of this property is that the direction of rotation is the same whether the light is, so to speak, going or coming, so that the rotational effect is doubled, i.e., the angle of rotation is doubled, when the light passing through is reflected and returned through the substance in the magnetic field. This property is not found in substances which are natural plane-polarized light rotators.

Particular substances under the Faraday effect will produce right-handed rotation and others left-handed rotation of the light transmitted through the material in the direction of the magnetic field. Except for ferromagnetic substances the rotation for a unit thickness of material for any particular wavelength of light incident thereon is proportional to the intensity of the magnetic field. The proportionality constant expressed in terms of minutes of arc per centimeter per oersted of field intensity is called the Verdet constant.

One of the substances which has been found useful in the practice of this invention is zinc sulfide. In fact many combinations of the substances in columns II and VI of the Periodic Table of Elements are believed to be suitable for application of the Faraday effect to cause rotation of the plane of polarization of polarized light incident thereon. The reaction involving the Verdet constant is:

$$\sigma = V \times H \times L$$

where:

$\sigma$ is the angle over which the light plane has been rotated;
V is the Verdet constant (or characteristic) of material;
H is the strength of the magnetic field; and
L is the length of material within the magnetic field.

In the implementation of a memory element according to this invention a source of preferably but not necessarily monochromatic light is applied to a bundle of fibers of a substance (such as zinc sulfide, as mentioned above) through a polarizer. Each fiber passes through a field gap in a magnetic core of predetermined configuration and which may be of ferromagnetic construction. "Write" signal wires pass through the core to magnetize the core and create a magnetic field across the gap of the core which in turn rotates the plane of polarization of the polarized monochromatic light incident on the fiber. An analyzer or depolarizer at the other end of the fiber will sense the rotation by either passing or extinguishing the light on to a sensor in the light path. The presence of light or its absence is indicative of the state of the core as having, or not having the appropriate bit of information stored therein. A photoelectric device such as a photomultiplier, photoconductor, or other sensor of light changes may be used to perform the sensing function. Since the light change indication of the state of the memory core is determined in an element remote from the core, its state remains unchanged by the read or sampling process which is accomplished at the output of the photoelectric sensor. The sensor output may be fanned-out or otherwise applied to a plurality of output points without in any way affecting the state of the magnetic core creating the rotation of the plane of polarization of the light indicative of the information bit.

Accordingly, it is an object of this invention to provide a non-destructive high speed memory system for digital computer storage elements.

It is a further object of this invention to provide a magnetic core memory system in combination with optical elements having a Verdet characteristic which in response to the magnetization of said core elements provides a remote independent indication of the state of the core and which does not revise the state of the core in order to provide such indication thereof.

It is another object of this invention to provide a very high speed memory system for information storage which can be read without destruction of the stored information.

It is a still further object of this invention to provide a novel means for rotation of the plane of polarization of polarized light in an optic fiber so as to indicate the state of magnetization of a predetermined type of magnetic core in a high speed non-destructive memory system.

Yet another object of this invention is to provide a high speed information storage or retrieval device.

A further object of this invention is to provide a novel memory device which is economical of manufacture.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the inventon.

Figure 1:
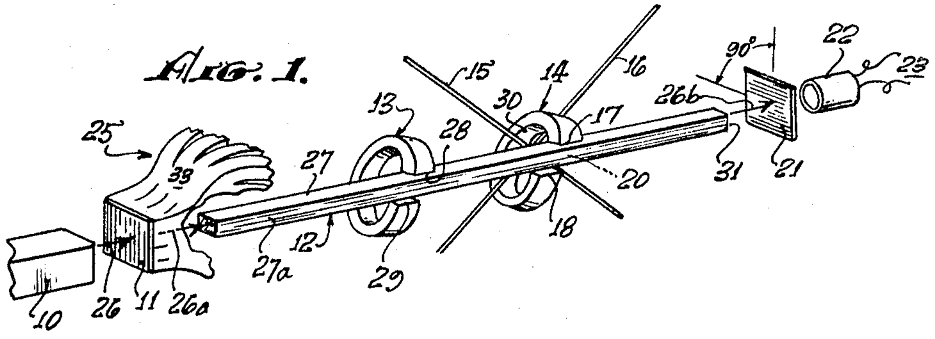
FIGURE 1 is a partially schematic drawing of a fiber optical memory element in a computer use configuration according to this invention.

Referring now to the figures generally and more particularly to FIGURE 1. The memory element of this invention is shown in the form of a single fiber 12, a part of a bundle 25 of fiber optical element in a light path shown by arrow 26 derived from a light source 10. A polarizing element 11 is interposed between optical fiber 12 and light source 10 to polarize beam of light 26*a* impinging on the fiber optic bundle 25. Single fiber 12 is shown separated out from bundle 25 so as to clearly illustrate the principles and construction of a system according to this invention.

In a practical embodiment of the invention as illustrated in FIGURE 1 each of the optical fiber elements of bundle 25 will be identical to fiber element 12. Each such fiber element as 12 will have the toroidal magnetic elements 13 and 14 associated therewith as further described hereinafter. As shown in FIGURE 1 each fiber 12 should be approximately rectangular to avoid loss of polarization of the light beam that is being conducted through it. The surfaces 27 and 27*a* and their opposite faces not visible in the illustration of FIGURE 1 may be coated with a material such as aluminum or the like to make each individual fiber 12 insensitive to radiation impinging thereon from the sides against the surfaces such as 27, 27*a* and their opposite faces. Magnetic element 13 is a generally toroidal permanent magnet of a configuration similar to that of a split washer in which the magnetic field thereof appears between the pole faces 28 and 29 of magnetic element 13. The gap between faces 28 and 29 is positioned so that the magnetic lines of force pass through optical fiber 12 in the same direction as the plane of polarization imparted to light beam 26*a*. The shape of magnetic elements 13 and 14 is of significant importance in achieving the high efficiency of the invention. Although the split washer shape is not necessary, it is readily observed in FIGURE 3 that this configuration with poles 17 and 18 laterally displaced creates magnetic lines of force 20 which have a horizontal component represented by vector *h*. As stated hereabove, it is the component of the magnetic force i.e. that component which is parallel to the direction of the light beam which achieves the Faraday effect. Thus, the split washer configuration of elements 13 and 14 makes operation more efficient than could otherwise be attained. If the split washer configuration were not used in this invention and the elements 13 and 14 arranged so that poles 17 and 18 were in lateral alignment, the lines of magnetic force would be perpendicular to the direction of the light beam and the Faraday effect would not be achieved. However, the plane of polarization of the beam would nevertheless be rotated due to the cotton-mouton effect which is an analogous effect to the Faraday effect but which depends on the field perpendicular to the direction of propagation. The Faraday effect is much stronger than the cotton-mouton effect and therefore the split washer configuration of elements 13 and 14 is chosen to provide significantly greater efficiency. The magnetic field appearing between pole faces 28 and 29 sets the fiber to a condition representative of one of the stable states of the computer, for example a "zero" or "one" condition of the computer whichever is to be used in connection with this particular fiber. Magnetic element 14 positioned further along the path of fiber 12 is a writing magnet of identical configuration to magnet 12, but which has write wires 15 and 16 passing through the center 30 thereof. The magnetic field of core 14 will appear between pole faces 17 and 18 across fiber 12. Magnetic elements 13 and 14 are made of a magnetic material such as alnico or the like which has a high degree of magnetic retention so that the magnitization can result from the application of a short duration current pulse. The field is developed when a current pulse is passed conjunctively through wires 16 and 15. When the field resulting from the current pulse through wires 15 or 16 aids the field appearing across pole faces 28 and 29 of magnetic element 13 there will be a rotation of the plane of polarization of the light passing therethrough, but when the magnetic field between pole faces 17 and 18 of magnetic element 14 is opposing the field across pole faces 28 and 29 of magnetic element 13 there will be no net rotation of the plane of polarization of the light passing along fiber 12. That is, since magnetic element 13 has been previously magnetized and since element 14 is constructed similarly to element 13, the magnetization of element 14 in an opposite sense to that of element 13 will approximately neutralize the effect of element 13. Beyond the far end 31 of optical fiber 12 a depolarizer or analyzer 21 is positioned in the light path designated as 26*b* which represents the component of the initial light path entering the fiber optical element and wherein the polarization angle has been rotated and is shown at 26*a*. Beyond polarizer or analyzer 21 a sensor 22 is shown. Sensor 22 is one of a plurality of such sensors placed beyond polarizer 21, there being one for each of the fibers such as 12 in the fiber optic bundle 25.

Considering the fiber optic bundle 25 as occupying a space 2″ by 3″ it is possible to have about 1,000 such fibers in the bundle. In the area indicated at 33 in FIG. 1 the individual fibers of the bundle can be seen to have been spread out so as to accommodate the positioning of a ring such as 13 or 14 or both, on each fiber such as 12 making up the bundle 25. The ends of all of the other fibers in bundle 25 such as 31 of fiber 12 may be reformed prior to the location near analyzer 21 so as to occupy the same space as at the start of the light path at 26*a*.

As would be the case in other computer memory matrix elements involving magnetic cores it will be necessary in the application of the present invention for both the wires 16 and 15 to have a current pulse thereon in order to magnetize the gap between pole faces 17 and 18 of magnetic element 14 to create the condition in which there will result and be stored an information bit. If for example polarizer 11 provides for a vertically plane polarized transmission of light into fiber element 12 and magnet 13 creates a field which, say, rotates the plane of polarization of light some 30° clockwise from the vertical analyzer 21, being positioned to pass polarized light which has been rotated 90° with respect to the plane of polarization created by polarizer 11 and therefore nominally in the extinction plane, will still reduce the intensity of the light passing through fiber 12 on to sensor 22. An appropriate combination of current pulses on wires 15 and 16 may rotate the plane of polarization an additional 30° clockwise from the vertical plane thereby substantially increasing the intensity of light impinging on sensor 22. The leads of sensor 22 shown at 23 would normally be connected to some indicating means which would be energized by the output of sensor 22 upon sensing the increase in light intensity due to the rotation of the plane of polarization of the beam of light in optical fiber 12 by magnetic element 14 in response to the combination of current pulses appearing on wires 15 and 16. If it is to be assumed that this represents the storage of a "one" bit in the memory element represented by optical fiber 12 then an output from sensor 22 will represent the storage of a "one" in the memory element.

Figure 2:
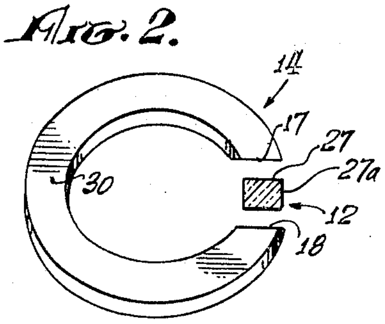
FIGURE 2 is a side elevational view of a core element as shown in FIGURE 1, a part of the fiber being shown in cross section.
Figure 3:
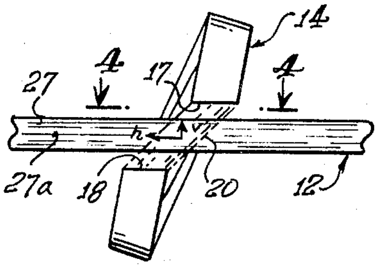
FIGURE 3 is an end-on view of the core detailed in FIGURE 2.
Figure 4:
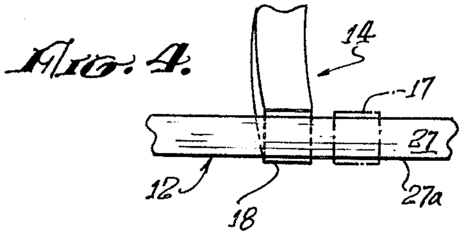
FIGURE 4 is a schematic of the location of elements of the core shown in FIGURES 3 and 4 with respect to the associate fiber.

In FIGURES 2, 3 and 4 there are shown 3 views, respectively, of a magnetic element such as 14 in three different planes. The view in FIGURE 2 is taken looking along the fiber optical element 12. The view in FIGURE 3 is taken perpendicular to the length of the optic fiber element 12. The view shown in FIGURE 4 can be considered as looking from the top or bottom of magnetic element 14 as it is positioned on optical fiber 12. This skewing of the location of the upper and lower pole faces 17 and 18 on either side of optical fiber element 12 is so done in order to create a magnetic field between the pole faces 17 and 18 which travels generally in the direction along which light is being transmitted through optical fiber 12. The angled cut through toroid element 14 which creates pole faces 17 and 18 is a practical means of obtaining the magnetic field in which lines of force are in the same general direction as the direction of propagation of the plane polarized light transmitted through the optic fiber element 12. Thus the lines of force of the megnetic field are essentially parallel to the direction of transmission of light through element 12 as is required for the Faraday effect to be achieved.

As has been previously discussed herein one of the substances which can be used for the fibers of optic fiber bundle 25 is zinc sulfide. Another material recently developed which has properties of rotating the plane of polarization of light when subjected to a magnetic field is europium orthosilicate. This material is said to be nearly ten times as effective as previously known materials for this purpose.

Considering, then, a bundle of optical fibers 25 each of which has a generally rectangular cross section such as shown in the optic fiber 12 in FIGURE 1 and made of a substance such as zinc sulfide or europium orthosilicate or other translucent compunds of elements in Groups II and VI of the Periodic Table of Elements. The bundle 15 placed in a beam of vertically plane polarized light (preferably but not necessarily monochromatic) and each of the fibers of the bundle is separated so as to have placed over each a magnetic element such as 13 of fixed magnetic field and followed by a second magnetic element such as 14 which will generate a magnetic field when current-pulse carrying wires such as 15 and 16 passing through the center of element 14 both have had an appropriate current pulse thereon. As discussed previously herein, the pervious pulse is sufficient because of the high retentivity of the magnetic elements. Each of the fibers of the bundle join together again beyond magnets 13 and 14. Each fiber which has been subjected to a magnetic field resulting from the passage through the wires 15 and 16 of the previously mentioned current pulse will show a rotation of the plane of polarization of the vertically plane-polarized light impinging thereon due to the above mentioned magnetic field. Because of the two magnetic elements 13 and 14, there is either a significant amount of rotation or substantially no rotation. Each of the elements 13 and 14, however, rotates the plane of polarization either clockwise or counter-clockwise. Thus, the use of two magnetic elements, while not necessary for proper operation, allows the use of elements 13 and 14 which need not be matched for efficient and positive operation. The presence of rotation of the plane of polarization will be evidenced by the use of an analyzer such as 21 in the light path at the far end of optic fiber bundle such as 25 which will show that rotation has been imparted thereto as hereinbefore described. A bundle of sensors such as 22 is positioned at the end of the fiber bundle 25 beyond the analyzer to sense the presence of rotated plane of polarization of light and to so indicate in external devices connected to sensors such as 22. Sensors such as 22 are well known. These may be semi-conductor devices such as epitaxial or planar silicon detectors which may have a photovoltaic output or alternately may be of the photoconductive or photoresistive type. Either type may be connected with appropriate output circuits by leads 23. The output circuits may be sampled non-destructively without affecting the state of the core element such as 14 which created the rotation of the plane of polarization of the light through fiber optical element 12. Sensor 22 is an independent element of the system although it is responsive to the condition of the light at the end of the fiber optic element such as 12.

Figure 5:
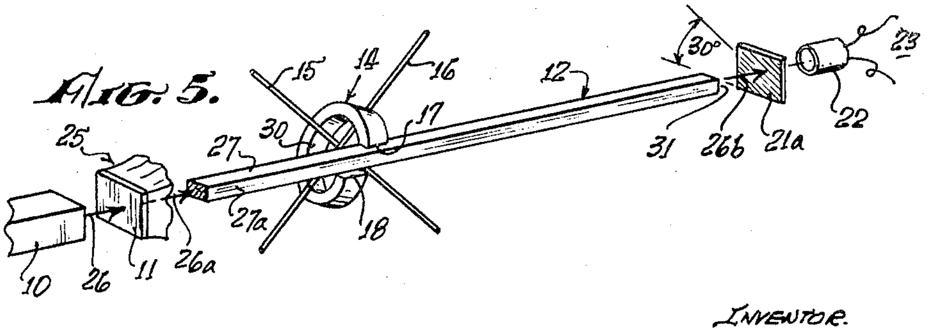
FIGURE 5 is a view similar to that shown in FIGURE 1 wherein means for the rotation of the plane of polarization of the incident polarized light upon an optic fiber in accordance with this invention is illustrated in another embodiment which is magnitude sensitive.

Referring now to FIGURE 5 wherein an optic element very similar to that shown in FIGURE 1 is illustrated only one magnetic element 14 has been placed over the optic fiber element 12. Again, as in the previous discussion, a polarizer 11 in the path of a light source 10 plane polarizes the beam of light in the vertical direction. The light is either extinguished or not at the opposite end 31 of optic fiber 12 by analyzer **21*a* unless there is substantial rotation of the plane of polarization created by polarizer 11 due to the magnetic field passing between pole faces 17 and 18. The rotation occurs in one direction or the other when a current pulse has appeared in wires 15 and 16 passing through the center core 30 of magnetic element 14. As in the discussion relative to FIGURE 1 there is also shown a sensor 22 in FIGURE 5 which performs the same function in exactly the same manner producing an output when there is light present and no output in the absence of light. The latter condition may be the case in the condition where core 14 has been so magnetized as to store a "zero." The output from sensor 22 may be present when the current pulse going into magnetic element 14 due to the passage of current through wires 15 and 16** was such as to store a "one."

There has been described hereinabove a novel information storage memory system from which the information may be retrieved without changing the condition of the cores such as 14 in which the storage condition has been created. The novel system consists of a bundle 25 of optical fibers such as 12 each of which has about it a magnetic element or elements by which the optical fiber is modified in its polarized light transmitting characteristics. The materials of the optic fibers are those which have a Verdet characteristic. The Verdet characteristic is such that when plane polarized light is transmitted through the fiber in a magnetic field parallel to the direction of transmission, the plane of polarization will be rotated by the changes in magnetic field. Detection means which senses the rotation of the plane of polarization of the light transmitted through the optic fiber is provided to indicate the rotation as a light intensity function representative of the condition of a magnetic core element creating the polarization rotating magnetic field.

What is claimed is:

1. An information storage system comprising:
means for generating a light beam;
a polarizer positioned in the path of said beam for polarizing said beam;
an optical element having a Verdet characteristic, said optical element being positioned in said path of said beam after said polarizer, said polarized beam impinging on said optical element and being transmitted therethrough;
a magnetic element having a gap, said gap being disposed in the vicinity of said optical element, so that a component of the lines of force of the maggetic field appearing across said gap is within and is parallel to said beam;
means for selectively energizing said magnetic means to first or second predetermined conditions;
an analyzer positioned in the path of said beam after said magnetic means, said analyzer being adapted to allow said beam to pass when said magnetic means is energized in said first condition to not allow said beam to pass when said magnetic means is energized in said second condition;
light sensing means, said light sensing means being after said analyzer; and,
indication means for indicating the condition of said light sensing means, said light sensing means being coupled to said indication means, whereby when said magnetic element is energized in said first condition, the magnetic field appearing across the gap thereof rotates the plane of polarization of the light being transmitted through said optical element disposed in said gap, so that said analyzer allows said beam to pass and said light sensing means detects the change in light intensity resulting thereby, the detection providing an indication in said indicating means to show that said magnetic element had been energized in said first condition.

2. An information storage system comprising:
means for generating a light beam;
a polarizer positioned in the path of said beam for polarizing said beam;
an optical element having a characteristic, such that polarized light transmitted therein will be rotated in the presence of an electromagnetic field, said optical element being positioned in such path of said beam after said polarizer, said polarized beam impinging on said optical element and being transmitted therethrough;
a magnetic element having a gap, said gap being disposed in the vicinity of said optical element, so that lines of force of the magnetic field appearing across said gap pass through said beam;
means for selectively energizing said magnetic means to first or second predetermined condition;
an analyzer positioned in the path of said beam after said magnetic means, said analyzer being adapted to allow said beam to pass when said magnetic means is energized in said first condition to not allow said beam to pass when said magnetic means is energized in said second condition;
light sensing means disposed in said path of said beam after said analyzer; and,
indication means for indicating the condition of said light sensing means, said light sensing means being coupled to said indication means, whereby when current is applied to said electrical conductive means of said magnetic element, the magnetic field in said first condition appearing across the gap thereof rotates the plane of polarization of the light being transmitted through said optical element disposed in said gap, so that said analyzer allows said beam to pass and said light sensing means detects the change in light intensity resulting thereby, the detection providing an indication in said indication means to show that said magnetic element had been magnetized in said first condition.

3. An information storage system comprising:
means for generating a light beam;
a polarizer positioned in the path of said beam for polarizing said beam;
an optical element having a Verdet characteristic, said optical element being positioned in said path of said beam after said first polarizer, said polarized beam impinging on said optical element and being transmitted therethrough;
a magnetic element having a gap, said gap being disposed in the vicinity of said optical element, so that a component of the lines of force of the magnetic field appearing across said gap is parallel to said beam;
means for selectively energizing said magnetic means to first or second predetermined conditions;
an analyzer positioned in the path of said beam after said magnetic means, said analyzer being adapted to allow said beam to pass when said magnetic means is energized in said first condition to not allow said beam to pass when said magnetic means is energized in said second condition;
light sensing means disposed in said path of said beam after said analyzer; and,
indication means for indicating the condition of said light sensing means, said light sensing means being coupled to said indication means,
whereby when current is applied to said electrical conductive means of said magnetic element, the magnetic field in said first condition appearing across the gap thereof rotates the plane of polarization of the light being transmitted through said optical element disposed in said gap, so that said analyzer allows said beam to pass and said light sensing means detects the change in light intensity resulting thereby, the detection providing an indication in said indication means to show that said magnetic element had been magnetized in said first condition.

4. An information storage system comprising:
means for generating a light beam;
a first polarizer positioned in the path of said beam for polarizing said beam;
an optical element having a Verdet characteristic, said optical element being positioned in said path of said beam after said first polarizer, said polarized beam impinging on said optical element and being transmitted therethrough;
a magnetic element having a gap, said gap being disposed in the vicinity of said optical element, so that a component of the lines of force of the magnetic field appearing across said gap is parallel to said beam;
means for selectively energizing said magnetic means to first or second predetermined conditions;
a second polarizer positioned in the path of said beam after said magnetic means, said second polarizer being adapted to allow said beam to pass when said magnetic means is energized in said first condition to not allow said beam to pass when said magnetic means is energized in said second condition;
light sensing means disposed in said path of said beam after said second polarizer; and,
indication means for indicating the condition of said light sensing means, said light sensing means being coupled to said indication means, whereby when current is applied to said electrical conductive means of said magnetic element, the magnetic field in said first condition appearing across the gap thereof rotates the plane of polarization of the light beam transmitted through said optical element disposed in said gap, so that said second polarizer allows said beam to pass and said light sensing means detects the change in light intensity resulting thereby, the detection providing an indication in said indication means to show that sad magnetic element had been magnetized in said first condition.

5. An information storage system comprising:
means for generating a light beam;
a first polarizer positioned in the path of said beam for polarizing said beam;
an optical element having a Verdet characteristic, said optical element being positioned in said path of said beam after said first polarizer, said polarized beam impinging on said optical element and being transmitted therethrough;
a magnet having a field gap disposed in the vicinity of said optical element so that a component of the lines of force of the magnetic field appearing across said field gap passes through and is parallel to said beam;
a magnetic core element having a gap, said gap being disposed in the vicinity of said optical element, so that a component of the lines of force of the magnetic field appearing across said gap is within and is parallel to said beam, said magnetic core element being positioned after said magnet;
electrical conductive means passing by said magnetic element for selectively magnetizing said magnetic element in first and second conditions;
a second polarizer positioned in the path of said beam after said magnetic element, said second polarizer being set to allow said beam to pass when said magnetic element is magnetized in said first condition and to not allow said beam to pass when said magnetic element is magnetized to said second condition;
light sensing means disposed in said path of said beam after said second polarizer; and,
indication means for indicating the condition of said light sensing means, said light sensing means being coupled to said indication means, whereby when current is applied to said electrical conductive means of said magnetic element, the magnetic field appearing across the gap thereof rotates the plane of polarization of the light being transmitted through said optical element disposed in said gap in a manner to aid or oppose rotation resulting from the field of said magnet so that said second polarizer allows said beam to pass when said magnetic element is magnetized to a first condition and does not allow said beam to pass when said magnetic element is magnetized to a second condition and said light sensing means detects the change in light intensity resulting thereby, the detection providing an indication in said indication means to show that said magnetic element had been magnetized in said first condition of said second condition.

6. A device as claimed in claim 3, wherein said magnetic element comprises a permanent magnet having two poles placed one from the other along said path of said beam.

7. A device as claimed in claim 4, wherein said magnetic element comprises a permanent magnet having two poles placed one from the other along said path of said beam.

8. A device as claimed in claim 5, wherein said magnetic element comprises a permanent magnet having two poles placed one from the other along said path of said beam.

References Cited

UNITED STATES PATENTS

| | | | |
|---|---|---|---|
| 3,150,356 | 9/1964 | Newman | 340—174 |
| 3,106,881 | 10/1963 | Kapur | 350—151 X |
| 3,030,852 | 4/1962 | Courtney-Pratt | 350—151 X |

JAMES W. MOFFITT, *Primary Examiner.*

U.S. Cl. X.R.

350—96, 151

UNITED STATES PATENT OFFICE

CERTIFICATE OF CORRECTION

Patent No. 3,436,745 April 1, 196

Donald George Knox

It is certified that error appears in the above identified patent and that said Letters Patent are hereby corrected as shown below:

Column 1, line 41, "operates" should read -- operations --. Column 2, line 29, "reaction" should read -- relation --. Column 5, line 51, "megneti should read -- magnetic --. Column 6, line 2, "pervious" should read -- previous --. Column 7, lines 30 and 31, "light sensing means, said light sensing means being after said analyzer; and," should read -- light sensing means disposed in said path of said beam after said analyzer; and, --; line "condition" should read -- conditions --. Column 9, line 9, "sad" should re -- said --. Column 10, line 19, "of" should read -- or --.

Signed and sealed this 14th day of April 1970.

(SEAL)
Attest:

Edward M. Fletcher, Jr.
Attesting Officer

WILLIAM E. SCHUYLER, JR.
Commissioner of Patents